(12) United States Patent
Waldeck

(10) Patent No.: US 8,788,962 B2
(45) Date of Patent: Jul. 22, 2014

(54) METHOD AND SYSTEM FOR DISPLAYING, LOCATING, AND BROWSING DATA FILES

(76) Inventor: Carsten Waldeck, Seeheim (DE)

(*) Notice: Subject to any disclaimer, the term of this patent is extended or adjusted under 35 U.S.C. 154(b) by 83 days.

(21) Appl. No.: 12/914,594

(22) Filed: Oct. 28, 2010

(65) Prior Publication Data

US 2011/0099511 A1    Apr. 28, 2011

Related U.S. Application Data

(63) Continuation of application No. 11/825,141, filed on Jul. 3, 2007, now abandoned.

(60) Provisional application No. 60/818,731, filed on Jul. 6, 2006.

(51) Int. Cl.
*G06F 3/048* (2013.01)

(52) U.S. Cl.
USPC .......................... 715/781; 715/853; 715/764

(58) Field of Classification Search
USPC ........................................ 715/764, 781, 853
See application file for complete search history.

(56) References Cited

U.S. PATENT DOCUMENTS

| | | | | |
|---|---|---|---|---|
| 5,636,350 A * | 6/1997 | Eick et al. | ...................... | 345/440 |
| 2004/0261038 A1 | 12/2004 | Ording et al. | | |
| 2005/0246313 A1 | 11/2005 | Turski et al. | | |
| 2006/0212833 A1 * | 9/2006 | Gallagher et al. | ............ | 715/848 |
| 2007/0040800 A1 * | 2/2007 | Forlines et al. | ............... | 345/158 |
| 2007/0209025 A1 | 9/2007 | Jing et al. | | |

FOREIGN PATENT DOCUMENTS

EP    1491990 A2    12/2004

OTHER PUBLICATIONS

"Liquid.browsing_1.0" downloaded from the Internet < http://www.liquidbrowsing.com/ > on Nov. 11, 2010 (4 pages).
Waldeck, "Liquid 2D Scatter Space for filing system browsing" LSS4OSX_IEEE, downloaded from the Internet < http://www.liquidbrowsing.com/media/LSS4OSX_IEEE.pdf > on Nov. 11, 2010 (6 pages).
Waldeck et al., "Mobile Liquid 2D Scatter Space (ML2DSS)"—Executive Summary—ML2DD-paper_d.pdf, downloaded from the Internet < http://www.liquidbrowsing.com/media/ML2DSS-paper_d.pdf > on Nov. 11, 2010 (5 pages).
Waldeck et al., Mobile Liquid 2D Scatter Space (ML2DSS)—Abstract—ML2DSS-paper_ieee.pdf, downloaded from the Internet < http://www.liquidbrowsing.com/media/ML2DSS-paper_ieee.pdf > on Nov. 11, 2010 (5 pages).
Waldeck, Carsten Mobile Liquid 2D Scatter Space (ML2DSS), dated 2004, IEEE Computer Society, Portal USPTO, 6 pages.
www.dig.com, "Liquefile Liquid Browser Finally Makes a Public Appearance", dated Jun. 19, 2006, 2 pages.
www.ieee.org, "Liquid 2D Scatter Space for File System Browsing", dated Jul. 6-8, 2005, 1 page.

* cited by examiner

*Primary Examiner* — Andrea Leggett
(74) *Attorney, Agent, or Firm* — Hickman Palermo Truong Becker Bingham Wong LLP; Adam C. Stone

(57) ABSTRACT

A computer-implemented user interface is described that includes a display window displaying data files having a data file descriptor associated with each data file. The data file descriptor describe at least a data file size, a data file date, a data file name and data file type. A slider bar controls the data files displayed in the display window where movement of the slider bar displays a greater number of the data files and the data file descriptors than displayed without movement of the slider bar.

15 Claims, 14 Drawing Sheets

METHOD AND SYSTEM FOR DISPLAYING, LOCATING, AND BROWSING DATA FILES

CROSS-REFERENCE TO RELATED APPLICATIONS; BENEFIT CLAIM

This application claims the benefit as a Continuation of U.S. Ser. No. 11/825,141, filed Jul. 3, 2007 now abandoned, which claims the benefit of U.S. Provisional Patent Application No. 60/818,731, filed Jul. 6, 2006, the entire disclosures of which are incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT STATEMENT

A portion of the disclosure of this patent document contains material to which a claim of copyright protection is made. The copyright owner has no objection to the facsimile reproduction by anyone of the patent document or the patent disclosure, as it appears in the Patent and Trademark Office patent files or records, but reserves all other copyrights whatsoever.

FIELD

The present invention relates to data storage systems, and more particularly, to a method and system for displaying, locating and browsing a large number of data files on display screens.

BACKGROUND

Continuously increasing memory capacity on storage systems, (for example computers, digital video recorders, personal device assistants, smart phones, cellular phones, file management systems, operating systems and the like) have allowed users to use their storage systems as the primary location to store many types of data files. These various storage systems has become a common source for centrally maintaining all audio, video and photo files for many users. While this trend has the advantage of centralizing all this information in one device, it has become increasingly difficult to (i) view and (ii) locate the many different files now being stored.

For viewing data files, conventional computer display screens (15 inch screens) allow a user to view about 30-60 objects (files) at a time on one screen without having to scroll down the screen of the display monitor. For mobile devices or other smaller screens, the number of objects is even less, in the range of 10-20 objects. In addition, with the current "table views" used in most computer systems, very limited information describing the file (date, file size, etc.) can be shown on one screen. So while the file name, date of creation/modification, file size, file type and label for each data file may be of interest to a viewer, typically only one or two of these fields can be seen on a standard display screen. Some proposed solutions to fit more files on a screen have been to make the file images smaller and then use a "table lens" feature to enlarge files as a user scrolls a pointer over that file. With this table lens solution, however, there are still many files embedded in sub-files or sub-folders that may not be located even with a lens view of a higher level of folders.

For locating data files, a conventional search result or sort result can end up displaying more files than can be viewed on a single screen. Also, conventional sort and search tools may not show all the files that are sub-files of folders contained grouped files. Thus, while folders may be shown on the screen, many files deep in the folder may not be shown or located if the search is not performed properly. In addition, sorting an entire memory of a device for certain files takes an inconvenient amount of time. Also, hidden files are too often misplaced. Still further, a user may not remember the name of the file and therefore the search or sort terms to locate the files are futile.

SUMMARY

An embodiment of the present invention is directed to a computer-implemented user interface that comprises a display window that displays a plurality of data files. Each of the plurality of data files has associated therewith a data file descriptor. The data file descriptor describes at least one of a data file size, a data file date, a data file name, a data file type and other metadata. The computer-implemented user interface also includes a slider bar that controls the data files displayed in the display window. Movement of the slider bar displays a greater number of the plurality of data files and the data file descriptors than displayed without movement of the slider bar.

In a further embodiment, the computer-implemented user interface comprises a display window that displays a plurality of data files where each of the plurality of data files has a data file descriptor that comprises a data file size. The data file size is represented by a graphical image that comprises a graphical image size in proportion to the size of the data file.

In a still further embodiment of the present invention, a computer-implemented user interface is described that comprises a display window displaying a plurality of data files where each of the plurality of data files comprises a data file descriptor comprising a data file date. The data file date is represented by a graphical image placed along a chronological timeline relative to the data file date of each of the other plurality of data files.

In a still further embodiment of the present invention, a computer-implemented user interface is disclosed that comprises a display window displaying a plurality of data files. Each of the plurality of data files comprising a data file descriptor, comprising a data file size, a data file date, a data file name and a data file type. Each of these data file descriptors are displayed in the display window.

BRIEF DESCRIPTION OF THE DRAWINGS

A more complex appreciation of the invention and many of the advantages thereof will be readily obtained as the same becomes better understood by references to the detailed description when considered in connection with the accompanying drawings, wherein.

DETAILED DESCRIPTION

Figure 1:
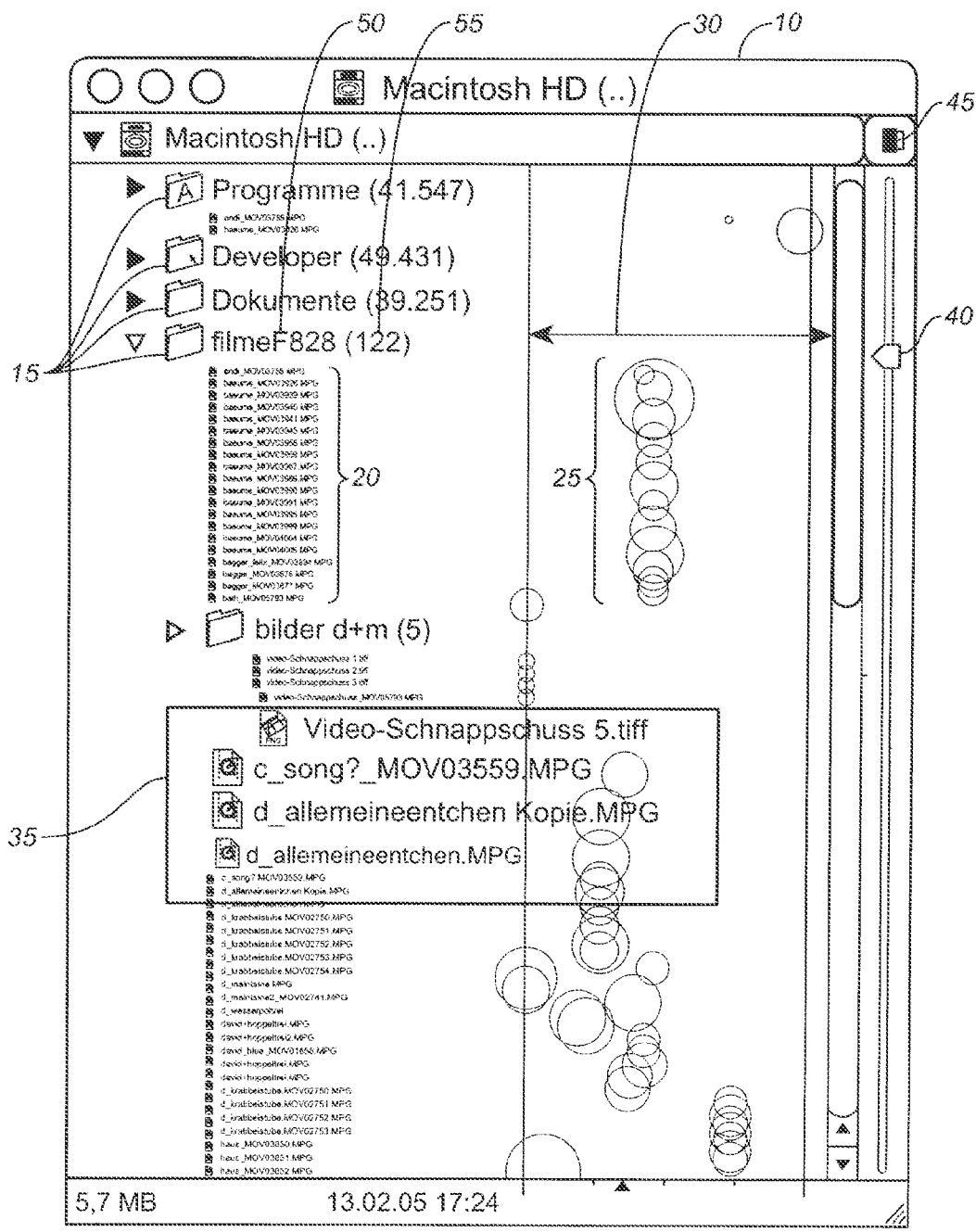
FIG. 1 is a front view of an embodiment of a user interface display window of the present invention.

Embodiments of the present invention are described below as relating to user interfaces implemented on a computer system or other data systems that are implemented in software, firmware, logic circuits or other processor-implemented methodology. Some portions of the detailed descriptions which follow are described in terms of procedures, steps, logic blocks, processing, and other symbolic representations of operations on data bits that can be performed on computer memory. These descriptions and representations are used by those skilled in the data processing arts to most effectively convey the substance of their work to others skilled in the art. A procedure, computer executed step, logic block, process, etc., is here, and generally, understood to be a self-consistent sequence of steps or instructions leading to a desired result. The steps are those requiring physical manipulations of physical quantities. Usually, though not necessarily, these quantities take the form of electrical (digital or analog equivalent) or magnetic signals capable of being stored, transferred, combined, compared, and otherwise manipulated in a computer system. It has proven convenient at times, principally for reasons of common usage, to refer to these signals as data, bits, values, elements, symbols, characters, terms, numbers, or the like.

All of these and similar terms are to be associated with the appropriate physical quantities and are merely convenient labels applied to these quantities. Unless specifically stated otherwise as apparent from the following description, it is appreciated that throughout the present invention, descriptions utilizing terms such as "indexing" or "processing" or "computing" or "translating" or "calculating" or "determining" or "scrolling" or "displaying" or "recognizing" or "generating" or "selecting" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the primary embodiment described herein is in a computer system environment, it is understood that other embodiments may include the system and method of the present invention. In one embodiment, the user interface of the present invention may be used on any data management system where data files must be viewed or located. In alternative embodiments, the user interface of the present invention may be implemented in any display for any data device, including, for example, digital video recorders, personal device assistants, smart phones, cellular phones, file management systems, operating systems and the like. Further embodiments include methodologies for using the user interface and systems incorporating the user interface.

Display Window with Slider Bar and Data File Descriptors

FIG. 1 is a front view of a display window in an embodiment of the present invention. The display window 10 can be displayed on any display screen that displays data files, for example on a computer display screen. The display screen may be part of any computer system, handheld device (for example, a cellular phone, smart phone, personal digital assistant, or any combination thereof). In addition, the display window 10 can be viewed on any type of data storage device including any digital video recorder, television screen, or other television receiver that is capable of data storage. The display window 10 may be shown on any type of display screen including a LCD, CRT, portable device screen, television, cellular phone screen or other screen that displays data files. The display window 10 contains folders 15 and data files 20 shown below the folders 15. Associated with each data file 20 is a data file descriptor 25 that takes the form of a dot or bubble in this embodiment. It is understood that in alternative embodiments, the data file descriptors 25 may take the form of any graphical or other type of image to represent the data files 20. Each of the data file descriptors 25 has a data file size that corresponds directly to the size of the data file 20. Thus, for example, the larger the data file 20, the larger the physical size of the data file descriptor 25 (i.e. a larger bubble in this embodiment). In addition to showing the size of the data file 20 by the size of the data file descriptor 25, the creation/modification date of the data file 20 is represented by the location of the data file descriptor 25 along a chronological timeline 30. That is, as the data descriptor 25 is created/modified, that date is placed along the chronological timeline 30 (along an x-axis) relative to the creation/modification date of the other data descriptors 25. In this way, a viewer that reviews the display window 10 can see from viewing all of the data descriptors 25 which data descriptor has the earlier or later creation/modification date. A benefit of this embodiment of the present invention is the simplicity of being able to view a substantial amount of information on the single display window 10. By simply viewing the data descriptors 25, a viewer can view the relative creation/modification date and the data file size immediately. In addition, a viewer can also tell the data file name since the data files 20 are listed in alphabetical order, in one embodiment. In this way, one view of the display window can give a substantial amount of information concerning the data files 20 that a viewer is looking at. It is very helpful to have these various data descriptors 25 associated with the data files 20 since a viewer may not remember any particular one of the data descriptors 25, for any one particular data file 20, but using the data file size 25, the data file date, the chronological timeline 30 or a data file name (alphabetically), a viewer may be able to locate the data file 20 quickly. While this embodiment uses the y-axis (alphabetical order) for the file name, the x-axis for the creation/modification date and the size of the graphical image of the data descriptor, it is understood that any visual parameters (e.g. color, shape, textures, etc.) may be used to represent any data file. In an alternative embodiment, the metadata, as is known in the art, associated with a file can also be represented by a data descriptor. A benefit of this embodiment of the present invention is that all the data files and the data file descriptors can be shown in one view that includes the folder hierarchy. That is, all the folders, sub-folders and data files can be viewed all at the same time with the data descriptors. This provides the advantage of viewing the entire hierarchical structure of the data files along with the data file descriptors that enables quick and easy locating and browsing of the data files.

In a further embodiment of the present invention, the hierarchical structure of the data files may be temporarily "flattened" to remove all sub-folders under the primary folder and only reveal the actual data files themselves. In this embodiment, a viewer can activate this flatten feature by clicking a button or pressing certain key strokes on a keyboard to activate the flatten feature. In one embodiment, the viewer holds the COMMAND key on a keyboard down and then presses the cursor over the file folder arrow located next to a file folder. The file folder arrow will then be shown as an "empty" arrow with no color within the arrow, in this embodiment. Other embodiments may display any type of symbol to signify that this flatten feature is activated. After activation, the file folder selected will only show the data files under that folder (including, in one embodiment, all the data files in subfolders under that folder), removing all the sub-folders under that file folder. This has the advantage of allowing the viewer to quickly locate the data files located deep within a folder and sub-folders that would take continuous opening of sub-folders to locate.

Also shown in FIG. 1 is a table lens 35 that expands the files as a mouse cursor moves over the files to enable the files to be read. In one embodiment, the table lens 35 may be enlarged by setting the width of the table lens so that a viewer can see several enlarged data files. The table lens 35 is synchronized with the data descriptors 25 so that as the table lens 35 scrolls over a data file, the data file label is enlarged and distance between data files is increased to allow for easier viewing of data files. A slider bar 40 is shown on the right side of the display window in this embodiment. A slider bar is a feature of the user interface in display window 10 that allows the data files 20 and corresponding data descriptors 25 to be condensed into the display window 10 in order to view more files in the same sized display window 10. The slider bar 40 is therefore able to control the data files displayed in the display window 10. It is understood that while the slider bar is shown as having a vertical movement along the display window 10, other embodiments may have a slider bar in any configuration where the movement or other use (for example, pressing a button or otherwise movement of a feature on the display window 10) would display a greater number of the data files 20 than when the slider bar 40 is not moved or activated. The slider bar 40, in this embodiment, may move in a vertical direction where movement in one direction will place more data files on the display window 10 and the movement in another direction will show fewer data files 20 in the display window 10, but allow those data files 20 to be viewed in a larger size. The table lens 35 would have a greater use when the slider bar is moved in a direction to show more data files 20 in the display window 10. A search button 45 (also called a "filter") shown on the display window 10 may be pressed by a mouse or other activation device in order for a filter (also called a "drawer") window (FIG. 2) to be displayed.

It is understood that the display window and all of the features shown as part of the display windows are generated using conventional software applications, for example, C, C++, Visual Basic, Java or other programming languages. This software may be run on a variety of operating system platforms including the MacIntosh platform of Apple Computer, Inc., the Windows platform of Microsoft Corporation, the Palm operating system of Palm, Inc., or any other operating system for any computer, handheld device, PDA or television, or television-related device.

In operation, a viewer that is browsing or searching for a file would open the file folder of, for example, "FilmeF828" shown as element 50. Here it is seen that element 50 has 122 (element 55) files within that folder. Those 122 files in the folder are viewed by looking at the data descriptors 25 showing the relative data file size and along the chronological timeline 30. This way, a viewer looking for a file, for example, a file beginning with the letter "M" would look to the middle of that file knowing that the file is listed alphabetically. In an alternative embodiment, a small alphabetical index can be provided. If a viewer does not know the file name, the user may know the relative size of the file and may look for a larger or smaller data descriptor 25 to locate the file. Alternatively, if the viewer does not know the file name or the file size, the viewer may know the date in which the file was created or modified and may therefore look for a file along the chronological timeline 30. It is understood that a viewer many times does not "know" for certainty the particular creation date, file size or other data descriptor. However, the viewer can use the data descriptor and location along the chronological timeline to use a combination of these data descriptors to browse the data files more efficiently. With all of these data descriptors available to a viewer in one single view, the benefit of the embodiment of the present invention is apparent in that a viewer may quickly browse or locate a data file.

Locating a Data File

Figure 2:
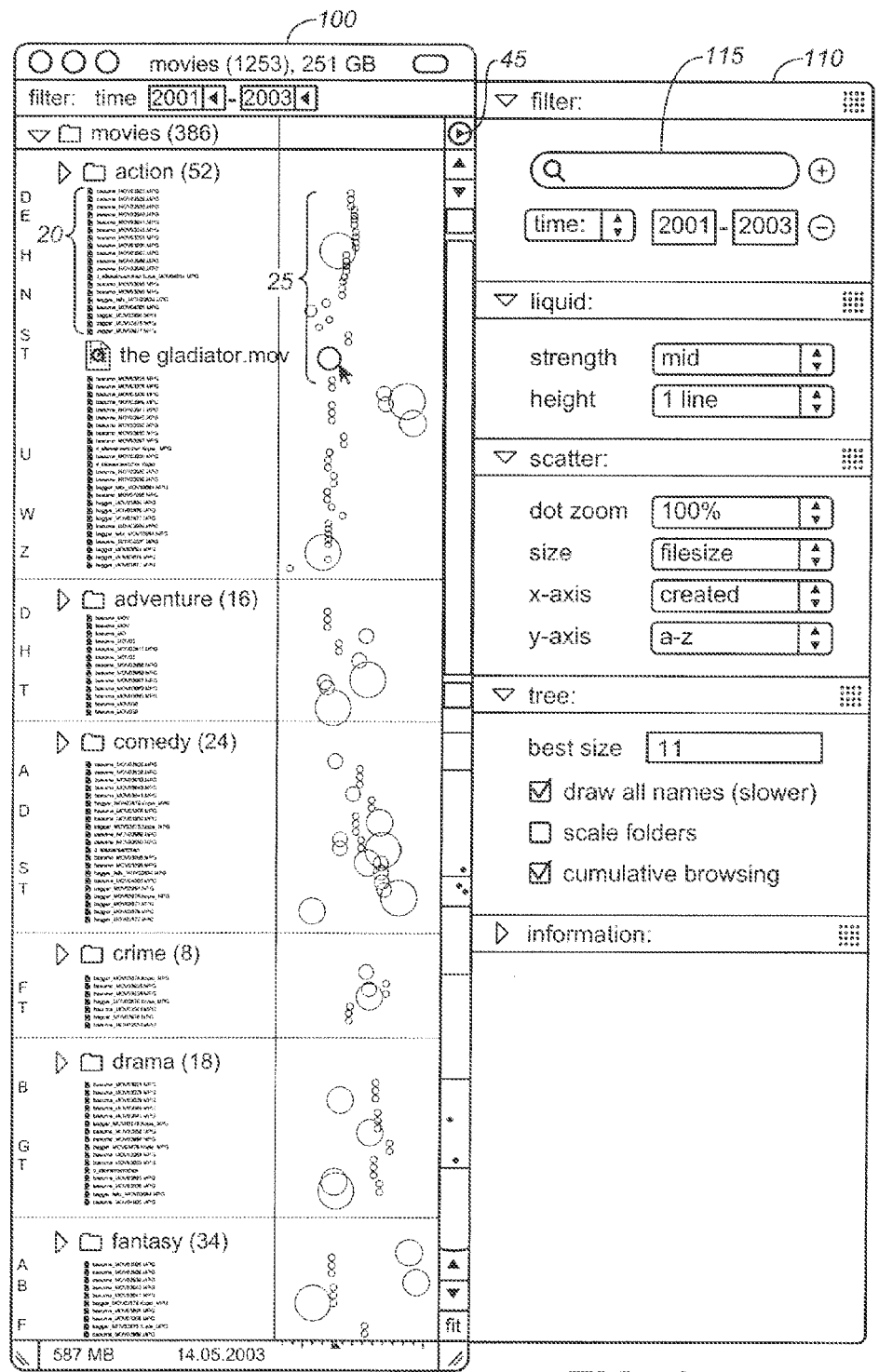
FIG. 2 is a front view of a user interface display window in a further embodiment of the present invention.

FIG. 2 is a front view of an embodiment of the user interface display window of the present invention. In FIG. 2, a display window 100 is shown with the data files 20 and the data descriptors 25 shown. In this view, a search button 45 has been pressed resulting in a search window 110 displayed from the display window 100. In the filter window 110, a viewer may search for files in the filter box 115 by typing in the full name (or partial name) of the data file being searched. The search function of this embodiment is a real-time search function in that, unlike prior art systems where the search terms are searched throughout the entire memory taking a long amount of time until all the memory is searched, the search filer 110 immediately shows the results of each search even as each letter or character is entered into the search window 115. Thus, for example, if a movie titled "Ballet" is searched, the viewer begins by typing "ba" and immediately all files that begin with "ba" or have "ba" in the file name are shown. One benefit of the filtering function is that the visualization on the screen remains the same after filtering, except that the data files that have been filtered are removed. Unlike prior art systems that merely provide the search result without providing the hierarchy of the data file, the embodiment of the present invention preserves the hierarchy. A viewer conducting a search using the embodiment of the present invention will have the display window maintain the hierarchy of the data files, but have the filter remove those files that are not within the searched terms. Another difference are the features that the search filter can search in different search modes, including a (1) universal mode that has the computer search all data files, (2) a selection mode that has the computer search a selected (e.g. highlighted) subset of data files, and (3) a visible search that has the computer search those data files that are visible in the display window. In this manner, the viewer has significant control of the files to be searched. This real-time feature enables quick access to files.

In operation, a viewer activates the filter window 110 by pressing a mouse or equivalent activation key to the search button 45. When the filter window 110 is opened, the viewer may then type in the first few letters of the desired search word. At this time, the data files that have these letters in their file name are generated in real-time. There are a number of benefits with this filter window. First, the results are generated in real-time, quicker than prior art systems that take more time for the memory of the storage system to locate. Second, the filtering does not destroy the file structures (hierarchy) when filtering. That is, in prior filter methods, the computer system would list a table of search results without showing the hierarchical structure of the data file. In the embodiment of the present invention, the search result maintains the hierarchical structure in the result. This provides a consistent view of the data files in their order. While the filter window 110 provides the search capability, the display window is also shown on the screen that provides full visualization of the files being searched in real-time. Third, the display screen has an automatic size correction feature that automatically enlarges data files depending on the number of files generated by the search. Should a search result in a large number of data files, the size of the files are smaller on the display screen and is shown real-time so a viewer can see the search result as it occurs. The data files are enlarged to fit the screen (in one embodiment, up to an 11 point font) when there is enough space in the display window to show the search result. As the number of search results increase, the size of each data file is automatically decreased. When a desired maximum size is reached (e.g. 11 point font), the data file sizes will no longer be increased. When the filter window is closed, the display window will return to the slider bar setting and the data files will be shown in their previous state.

Figure 3:
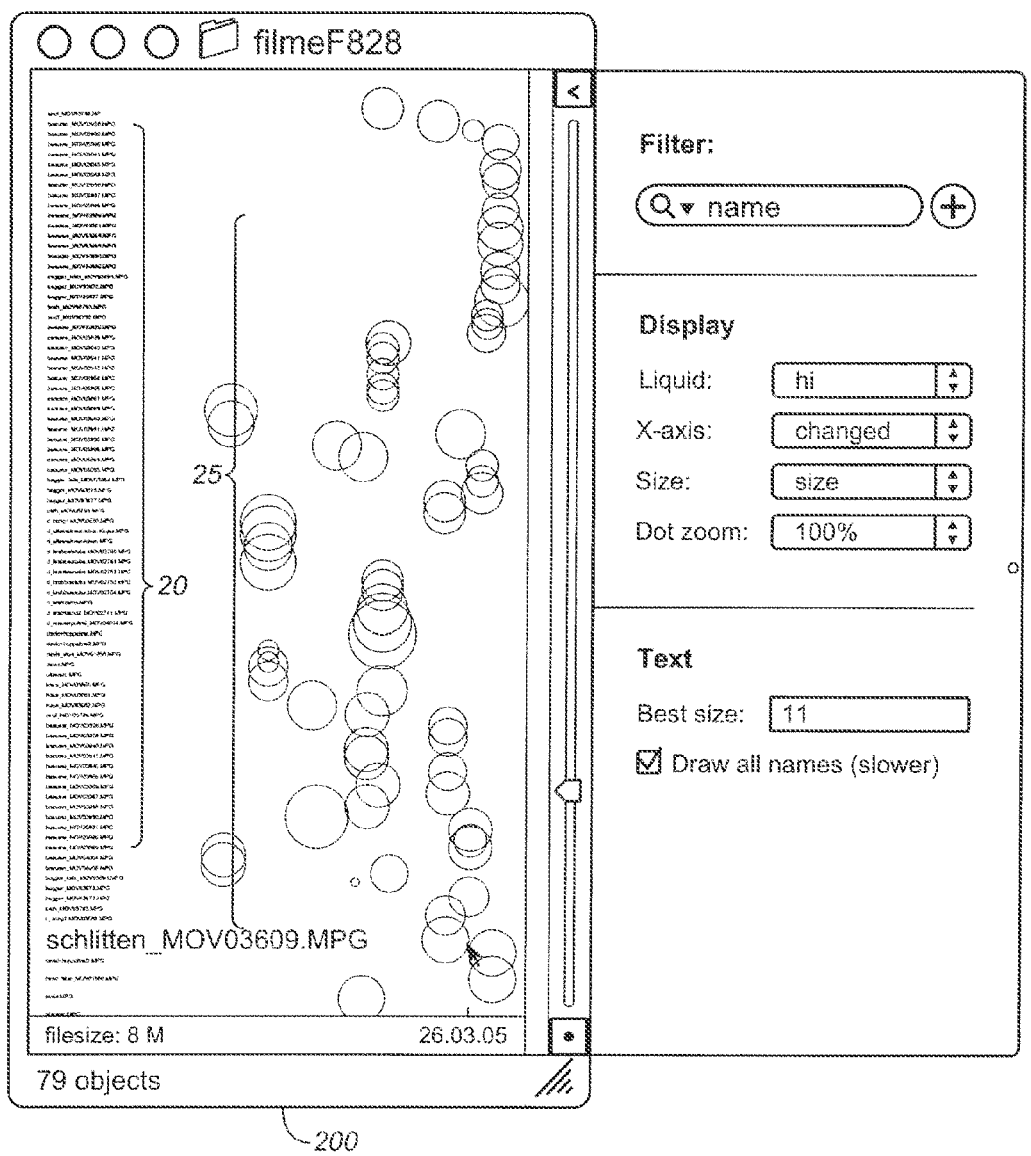
FIG. 3 is a front view of a user interface display window in a further embodiment of the present invention.

FIG. 3 is a front view of an embodiment of the user interface display window of the present invention. In FIG. 3, a display window 200 shows once again the data files 20 with data descriptors 25 scattered throughout the display window 200. In this embodiment, the data files 20 are shown in a pure table view, rather than a "tree" view where folders are shown with files within the folders.

Figure 5:
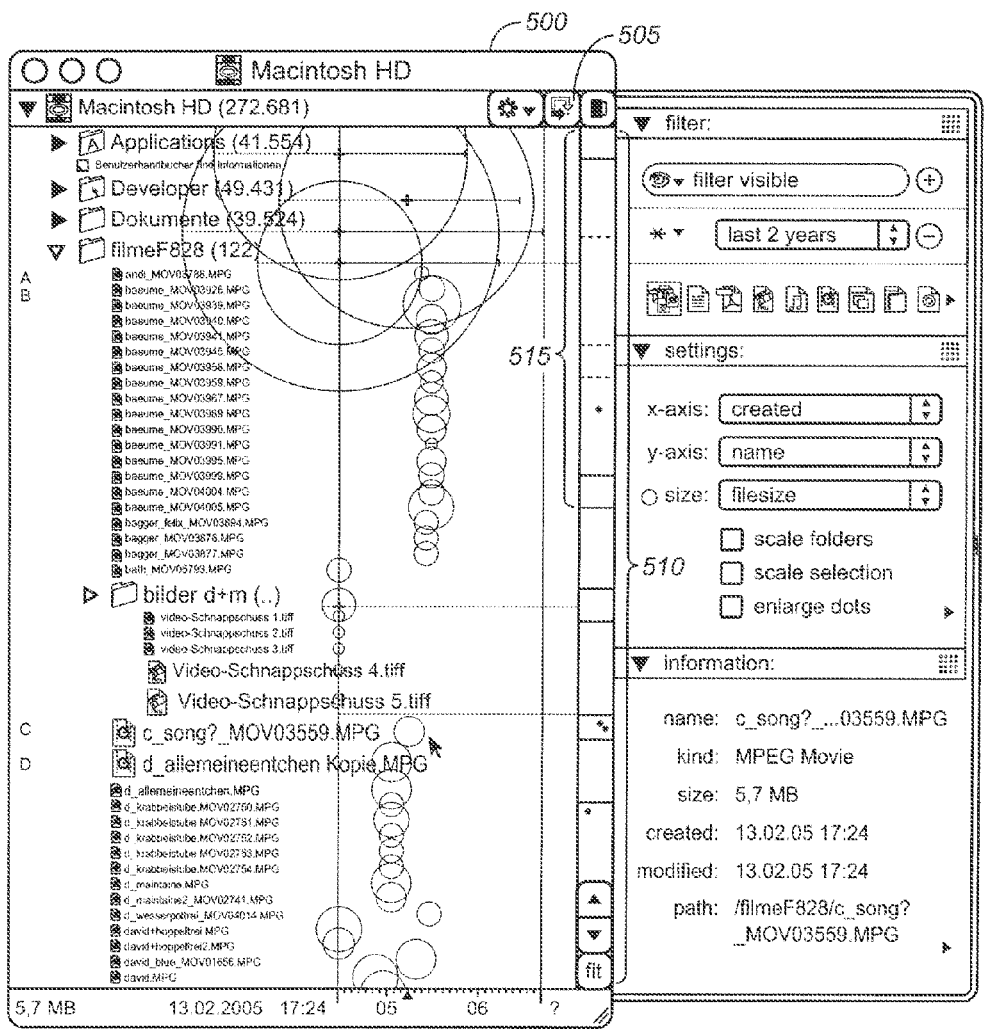
FIG. 5 is a front view of a user interface display window in a further embodiment of the present invention.
Figure 6:
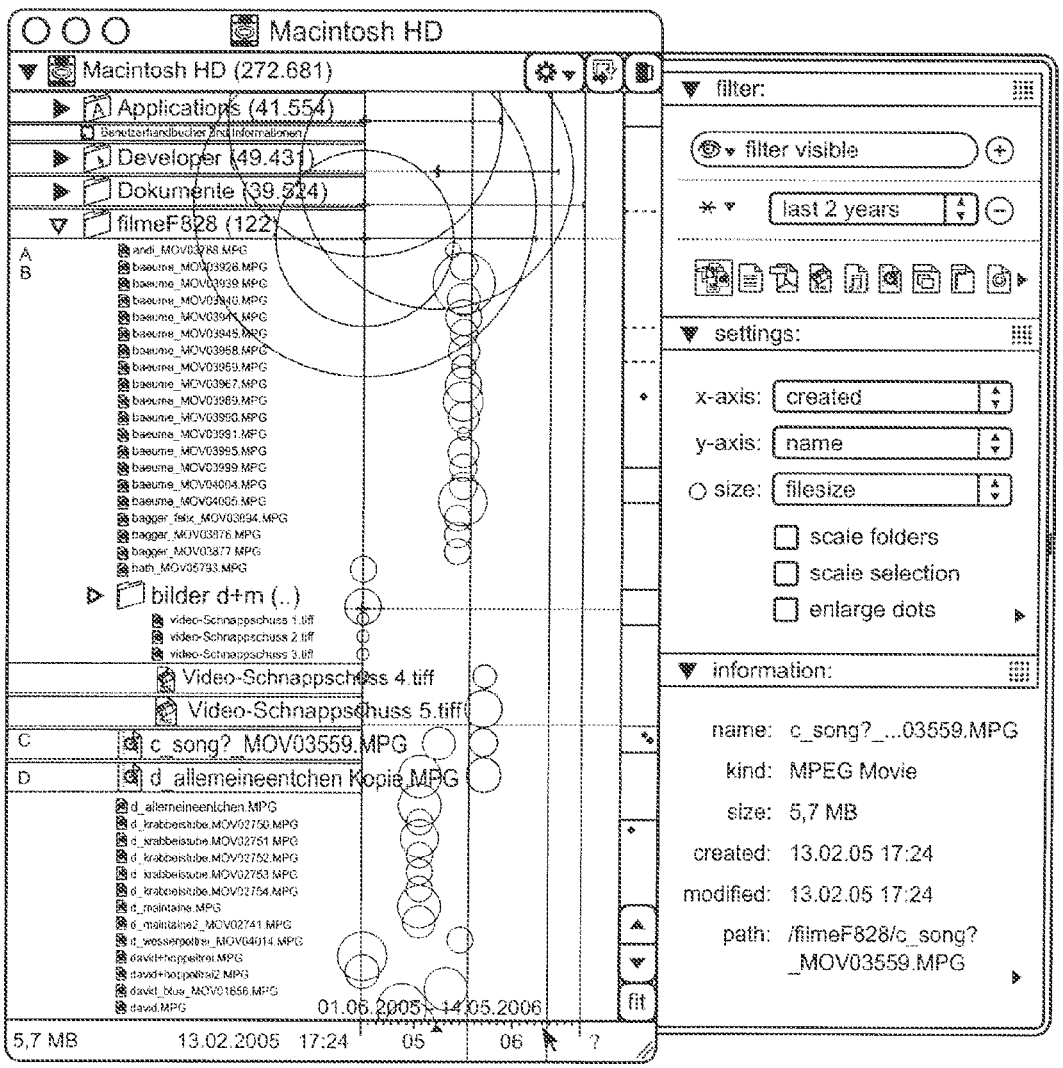
FIG. 6 is a front view of a user interface display window in a further embodiment of the present invention.
Figure 7:
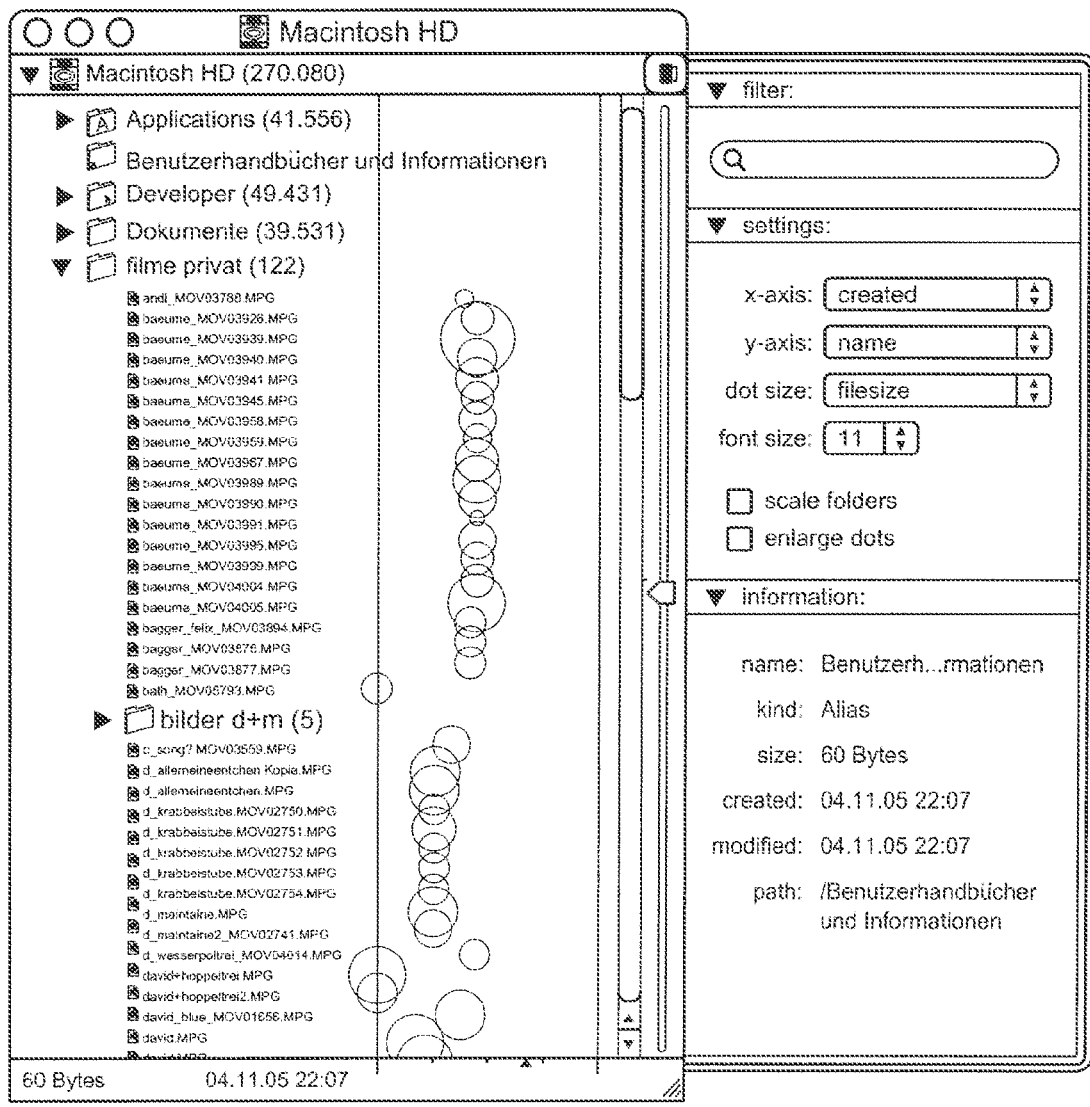
FIG. 7 is a front view of a user interface display window in a further embodiment of the present invention.
Figure 8:
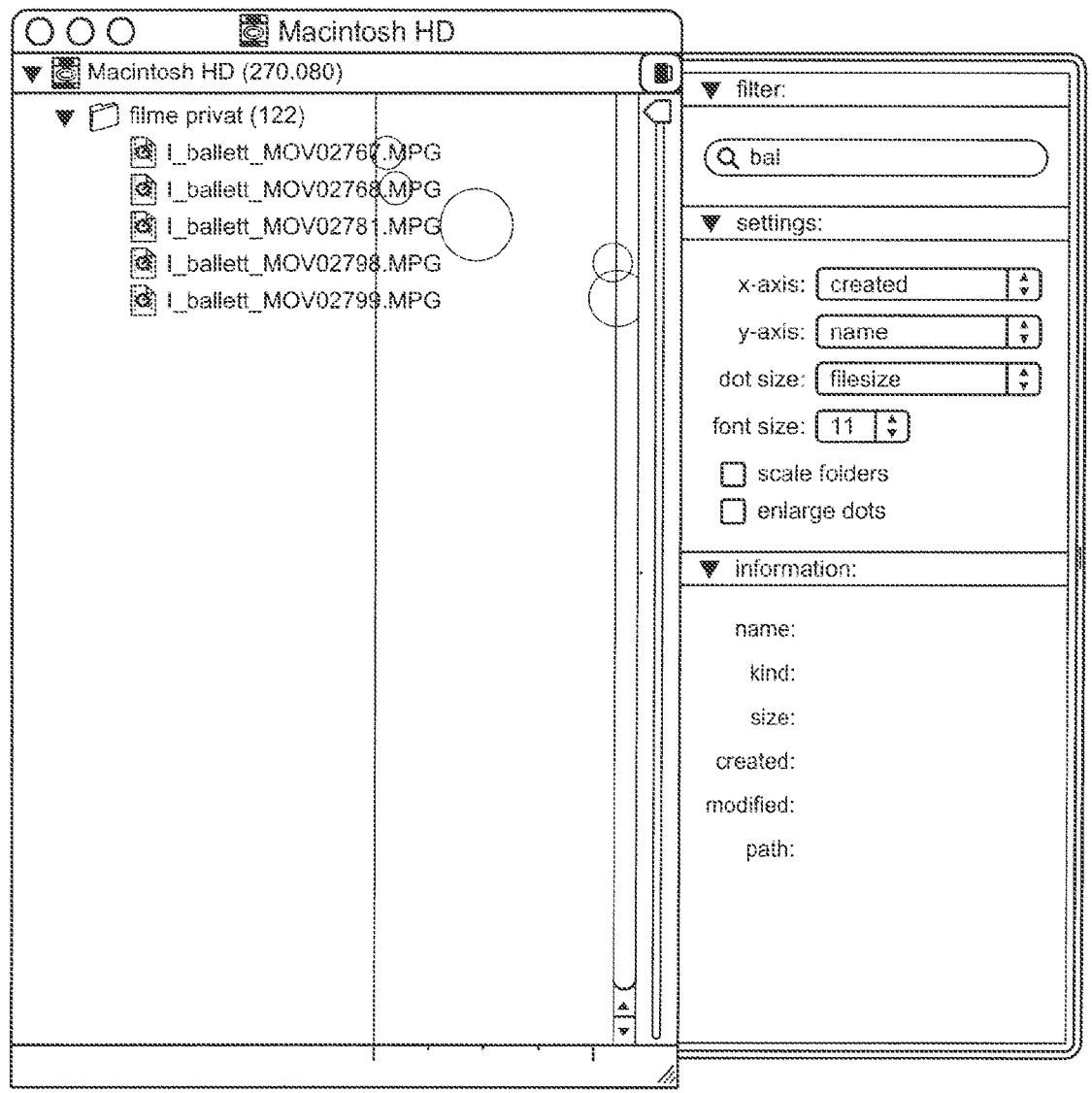
FIG. 8 is a front view of a user interface display window in a further embodiment of the present invention.
Figure 9:
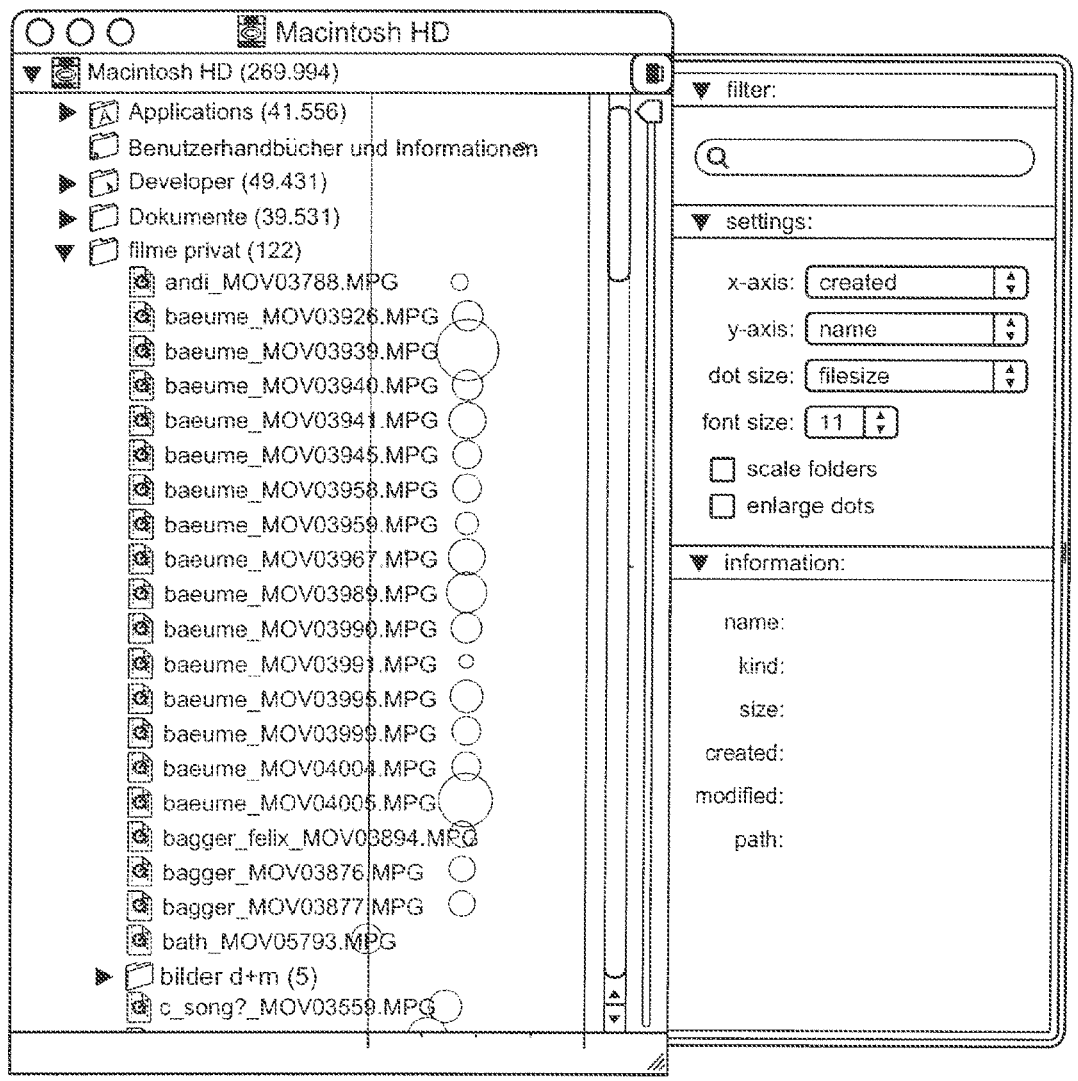
FIG. 9 is a front view of a user interface display window in a further embodiment of the present invention.
Figure 10:
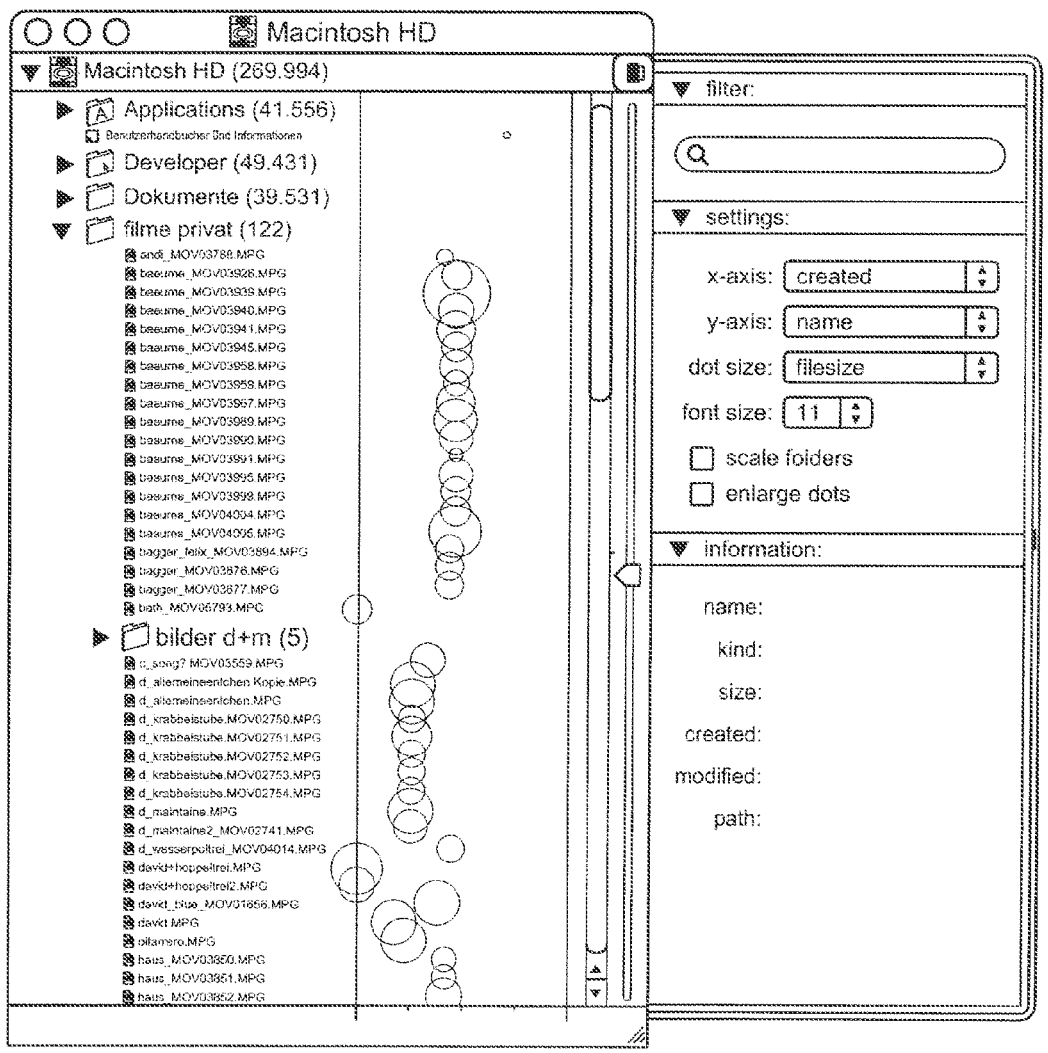
FIG. 10 is a front view of a user interface display window in a further embodiment of the present invention.
Figure 11:
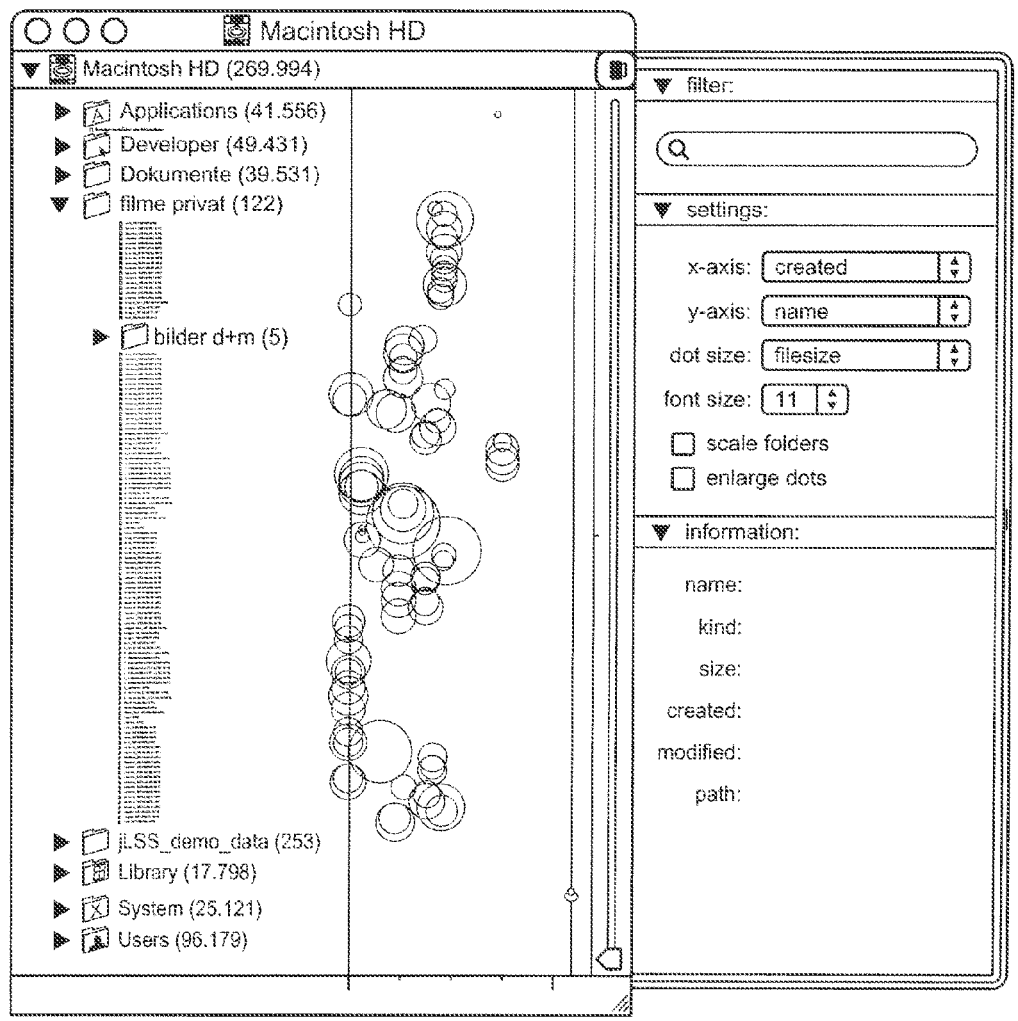
FIG. 11 is a front view of a user interface display window in a further embodiment of the present invention.
Figure 12:
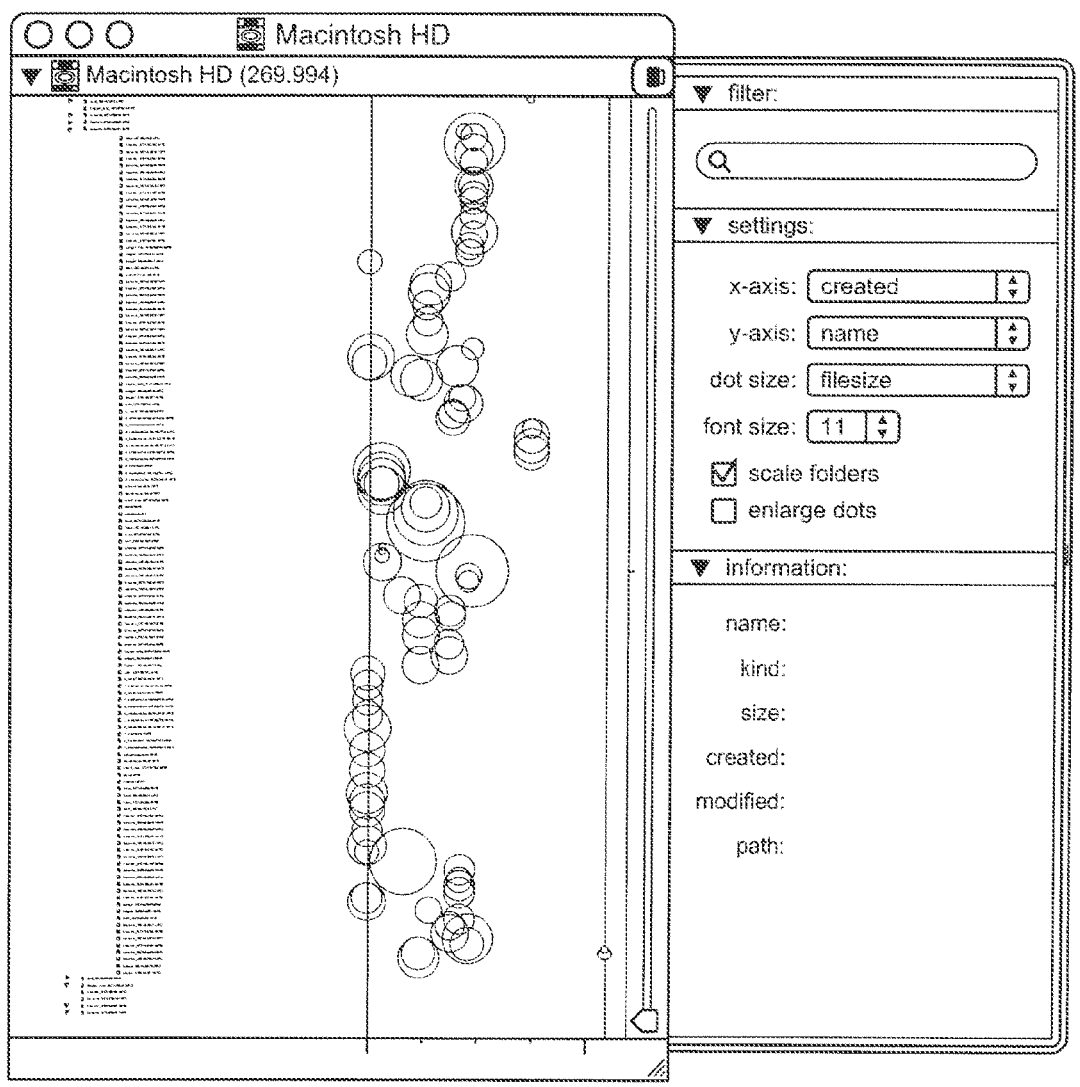
FIG. 12 is a front view of a user interface display window in a further embodiment of the present invention.
Figure 13:
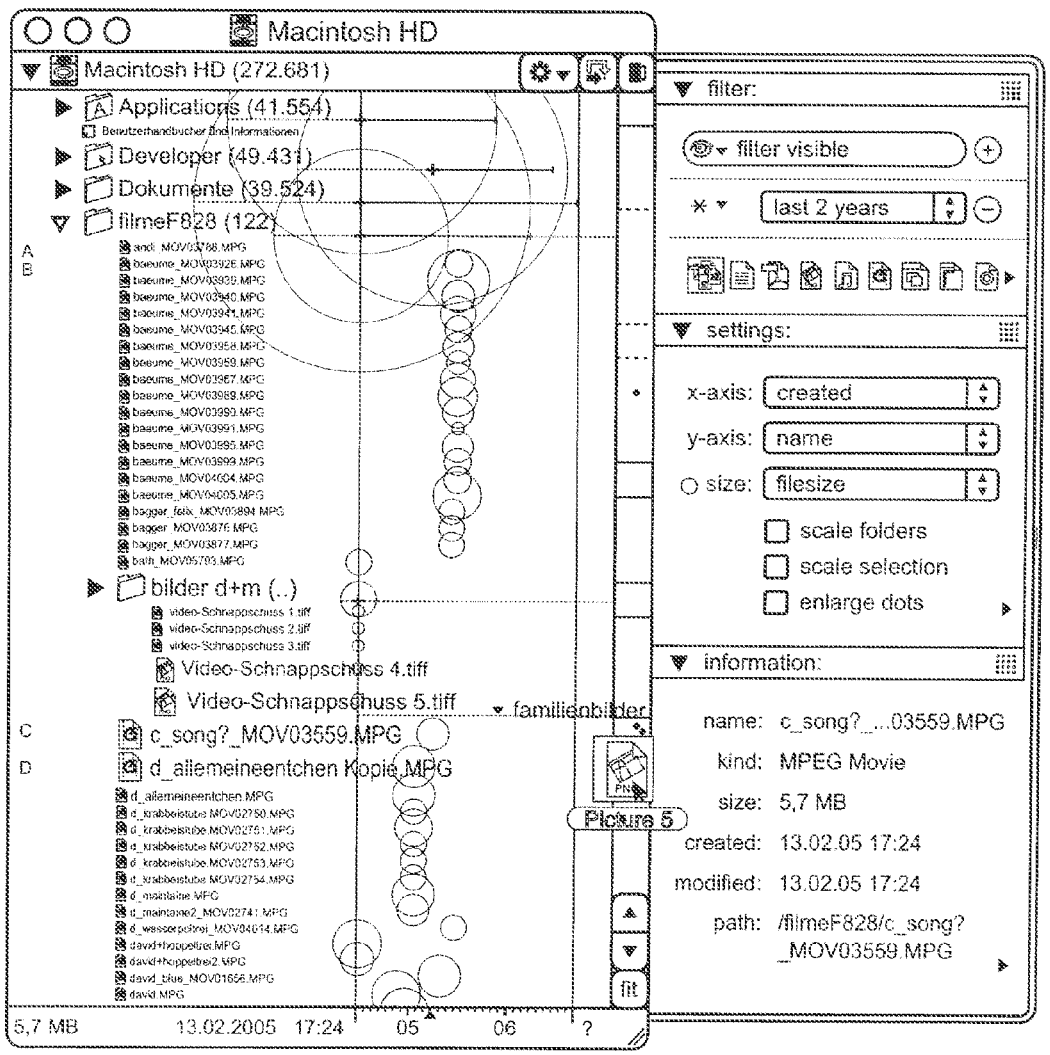
FIG. 13 is a front view of a user interface display window in a further embodiment of the present invention.
Figure 14:
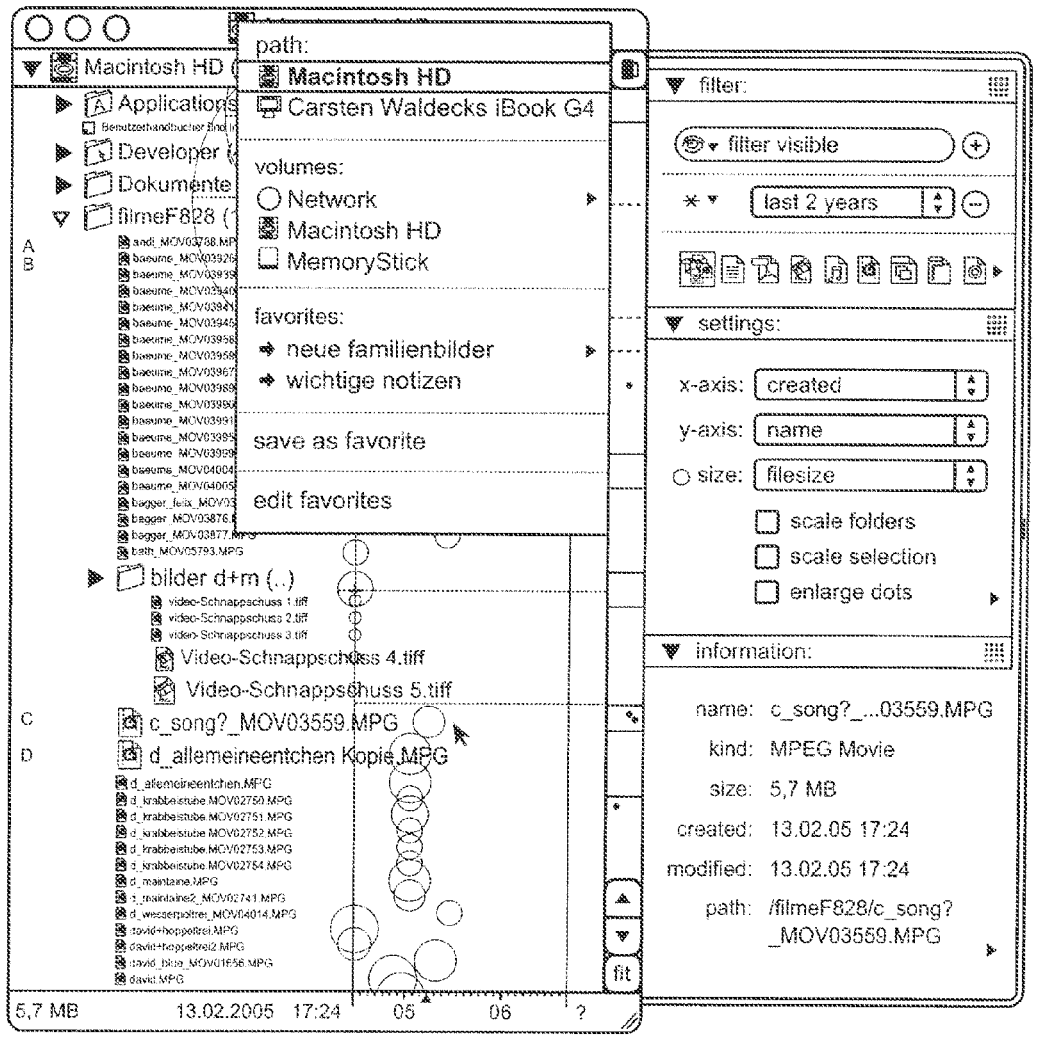
FIG. 14 is a front view of a user interface display window in a further embodiment of the present invention.

FIG. 5 is a front view of a user interface display window in a further embodiment of the present invention. In FIG. 5, additional features of the display window 500 are shown. A shortcut button is shown in the display window 500 that allows a viewer to view previous searches performed and saved. These saved searches that are viewed when the shortcut button is activated show not only the data files, but the data descriptors, such as the data file size representations and the chronological timeline. Also shown in FIG. 5 is a transparent scroll bar 510. The transparent scroll bar 510 gives a visual representation of all the files to view in the display window 500, with the current view shown having a highlighted portion 515. The embodiment of FIG. 5 further allows a viewer to select certain data descriptors, such as a group of data file size images or a portion of the chronological time line. By selecting these groups or portions, a viewer is able to view the data file and data file descriptors for those groups or portions selected.

FIGS. 6-14 are front views of further embodiments of a user interface display window of the present invention.
Computer System FIG. 4 is a block diagram view of a computer system on which an embodiment of the invention may be implemented.

The computer system 400 includes a processor 405 for executing program instructions stored in a memory 410. In some embodiments, processor 405 includes a single microprocessor, while in others, processor 405 includes a plurality of microprocessors to define a multi-processor system. The memory 410 stores instructions and data for execution by processor 405, including instructions and data for performing the methods described above. Depending on the extent of software implementation in computer system 400, the memory 410 stores executable code when in operation (e.g., the high-level code). The memory 410 includes, for example, banks of read-only memory (ROM), dynamic random access memory (DRAM) as well as high-speed cache memory. Further in FIG. 4, the computer system 400 incorporates any combination of additional devices. These include, but are not limited to, a mass storage device 415, one or more peripheral devices 420, an audio means 425, one or more input devices 430, one or more portable storage medium drives 435, a graphics subsystem 440, a display 445, and one or more output devices 450. The various components are connected via an appropriate bus 455 as known by those skilled in the art. In alternative embodiments, the components are connected through other communications media known in the art. In one example, processor 405 and memory 410 are connected via a local microprocessor bus; while mass storage device 415, peripheral devices 420, portable storage medium drives 435, and graphics subsystem 440 are connected via one or more input/output buses.

Figure 4:
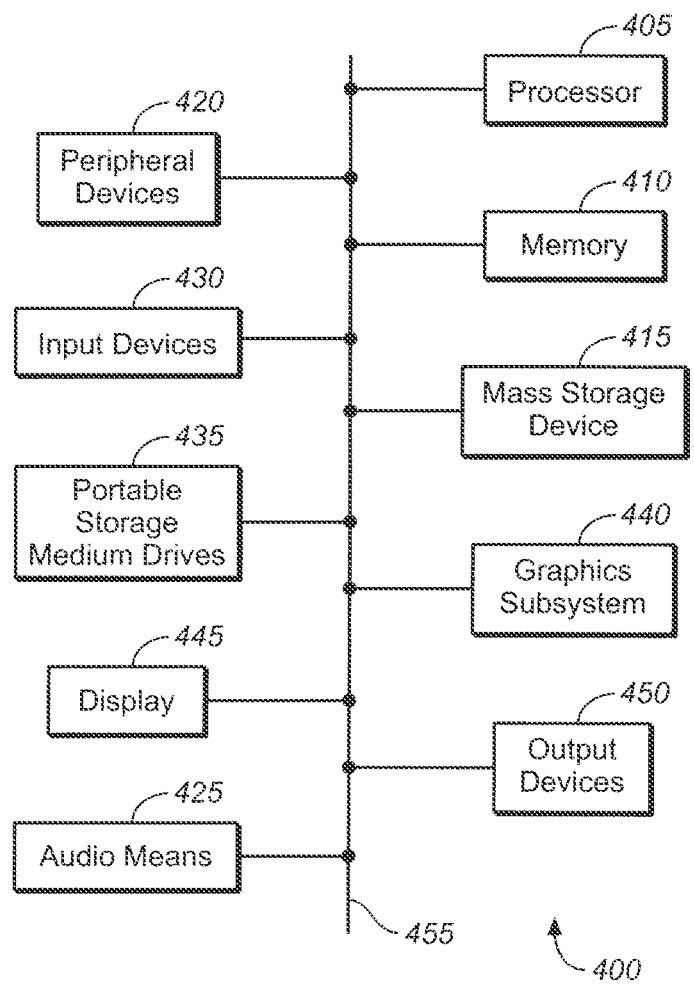
FIG. 4 is a block diagram view of a computer system on which an embodiment of the invention may be implemented.

Continuing in FIG. 4, mass storage device 415 is implemented as fixed and/or removable medium, for example, as a magnetic, optical, or magneto-optical disk drive. The drive is preferably a non-volatile storage device for storing data and instructions for use by processor 405. In some embodiments, mass storage device 415 stores client and server information, code for carrying out methods in accordance with exemplary embodiments of the invention, and computer instructions for processor 405. In other embodiments, computer instructions for performing methods in accordance with exemplary embodiments of the invention also are stored in processor 405. The computer instructions may be programmed using a computer programming language such as, for example, Java, C/C++, or Objective C.

In FIG. 4, the portable storage medium drive 435, in some embodiments, operates in conjunction with a portable non-volatile storage medium, such as a floppy disk, CD-ROM, or other computer-readable medium, to input and output data and code to and from the computer system 400. In some embodiments, methods performed in accordance with exemplary embodiments of the invention are implemented using computer instructions that are stored on such a portable medium and input to the computer system 400 via portable storage medium drive 435. In FIG. 4, the peripheral devices 420 include any type of computer support device, such as an input/output (I/O) interface, to add functionality to computer system 400. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 4, the graphics subsystem 440 and the display 345 provide output alternatives of the system. The graphics subsystem 440 and display 445 include conventional circuitry for operating upon and outputting data to be displayed, where such circuitry preferably includes a graphics processor, a frame buffer, and display driving circuitry. The display 445 may include a cathode ray tube (CRT) display, a liquid crystal display (LCD), or other suitable display devices. The graphics subsystem 440 receives textual and graphical information and processes the information for output to the display 445. In one embodiment, the display is capable of displaying the GUIs of FIGS. 1-3 and 5-14. A video card in the computer system 400 may also comprise a part of graphics subsystem 440.

In FIG. 4, audio means 425 preferably includes a sound card that receives audio signals from a peripheral microphone. In addition, audio means 425 may include a processor for processing sound. The signals can be processed by the processor in audio means 425 of computer system 400 and passed to other devices as, for example, streaming audio signals.

In some embodiments, programs for performing methods in accordance with exemplary embodiments of the invention are embodied as computer program products. These generally include a storage medium or medium having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other medium. Stored on one or more of the computer readable media, the program includes software for controlling both the hardware of a general purpose or specialized computer or microprocessor. This software also enables the computer or microprocessor to interact with a human or other mechanism utilizing the results of exemplary embodiments of the invention. Such software includes, but is not limited to, device drivers, operating systems and user applications.

It will be understood that the above-described apparatus and method are merely illustrative of applications of the principles of this invention and many other embodiments and modifications may be made without departing from the spirit and scope of the invention as defined in the claims.

What is claimed is:

1. A method implemented in a computer having at least one processor and at least one memory, the method comprising:
    displaying a display window as part of a user interface;
    displaying, on said display window, a first plurality of data file descriptors;
    wherein each data file descriptor of the first plurality of data file descriptors represents a first attribute of one corresponding data file object of a plurality of data file objects;
    wherein each data file object of the plurality of data file objects corresponds to either a data file or a data file folder;
    wherein the plurality of data file objects comprises one or more data file folders and one or more data files arranged in a file folder hierarchy;
    wherein displaying the first plurality of data file descriptors comprises displaying the first plurality of data file descriptors in a hierarchical view that visually conveys the file folder hierarchy;
    wherein the plurality of data file objects comprises a particular data file folder that contains one or more particular data file sub-folders and one or more particular data files contained within the one or more particular data file sub-folders;
    responsive to detecting user input, displaying a flattened view of the particular data file folder by removing display of the data file descriptors of the first plurality of data file descriptors corresponding to the one or more particular data file sub-folders and displaying the data file descriptors of the first plurality of data file descriptors corresponding to the one or more particular data files as if the one or more particular data files were contained directly, in the file folder hierarchy, in the particular data file folder;
    responsive to obtaining filtering criteria, removing, from the flattened view, display of data file descriptors of the first plurality of data file descriptors corresponding to any of the one or more particular data files that do not satisfy the filtering criteria.

2. The method of claim 1, further comprising:
    displaying, on said display window, a second plurality of data file descriptors;
    wherein each data file descriptor of the second plurality corresponds to one data file descriptor of the first plurality;
    wherein each data file descriptor of the second plurality represents a second attribute of the corresponding data file object;
    wherein each data file descriptor of the second plurality is displayed on the display window at a corresponding position representing a third attribute of the corresponding data file object.

3. The method of claim 2, wherein:
    the second attribute is data file object content size;
    each data file descriptor of the second plurality of data file descriptors is displayed in a graphical size in proportion to a content size of the data file object to which the data file descriptor of the second plurality corresponds.

4. The method of claim 2, wherein the method further comprises displaying each of the data file descriptors of the second plurality on the display window along one of a horizontal axis or a vertical axis of the display window at a corresponding position representing the third attribute of the data file object to which the data file descriptor of the second plurality corresponds.

5. The method of claim 2, further comprising:
    determining a number of the second plurality of data file descriptors that are displayed in a particular area of the display window;
    applying at least one visual effect to at least those data file descriptors of the second plurality included in the number;
    wherein the strength of the at least one visual effect is proportional to the number.

6. The method of claim 2, wherein:
    one or more data file objects of the plurality of data file objects are data file folders;
    each of the second plurality of data file descriptors comprises at least one visual attribute indicating whether the corresponding data file object is a data file or a data file folder.

7. The method of claim 2, wherein each of said second plurality of data file descriptors is a circle, a bubble, an abstract shape, or an image.

8. The method of claim 1, further comprising:
    displaying a lens configured to visually change each of said first plurality of data file descriptors as the lens moves over each of the first plurality of data file descriptors.

9. The method of claim 1,
    wherein the first attribute is data file object name, the second attribute is data file object content size, and the third attribute is one of a data file object creation date or a data file object modification date.

10. The method of claim 1, wherein the plurality of data file objects are part of a larger plurality of data file objects, the larger plurality of data file objects comprising a second plurality of data file objects not visually represented by the first plurality of data file descriptors, the method further comprising displaying a scrollbar on the display window and a third plurality of data file descriptors on the scrollbar, each data file descriptor of the third plurality of data file descriptors corresponding to one data file object of the larger plurality of data file objects.

11. The method of claim 1, further comprising:
displaying a scale control configured to resize each the first plurality of data file descriptors to represent a greater number or a lesser number of data file objects in the display window without changing a size of the display window.

12. The method of claim 1, wherein the plurality of data file objects comprises a first set of one or more data file objects and a second set of one or more data file objects, the method further comprising:
displaying a scale control configured to resize each of the first plurality of data file descriptors corresponding to the first set of one or more data file objects to represent a greater number or a lesser number of data file objects in the display window without resizing the display window and without resizing any of the first plurality of data file descriptors corresponding to the second set of one or more data file objects.

13. The method of claim 1, further comprising:
displaying a shortcut button which, when selected, causes displaying one or more search result data file objects that were identified as a result of a previous search for data file objects;
in response to input selecting the shortcut button,
displaying an interactive search result display window,
displaying, on the search result display window, a third plurality of data file
descriptors, each data file descriptor of the third plurality of data file descriptors representing the first attribute of one corresponding search result data file object of the one or more search result data file objects,
displaying, on said search result display window, a fourth plurality of data file descriptors, each data file descriptor of the fourth plurality corresponding to one data file descriptor of the third plurality, each data file descriptor of the fourth plurality representing the second attribute of the corresponding search result data file object, each data file descriptor of the fourth plurality being displayed on the search result display window at a corresponding position representing the third attribute of the corresponding search result data file object.

14. A computer system comprising one or more processors, at least one memory, and a computer display, the memory storing computer-executable instructions which, when executed by the one or more processors, cause the one or more processors to perform:
displaying a display window as part of a user interface;
displaying, on said display window, a first plurality of data file descriptors;
wherein each data file descriptor of the first plurality of data file descriptors represents a first attribute of one corresponding data file object of a plurality of data file objects;
wherein each data file object of the plurality of data file objects corresponds to either a data file or a data file folder;
wherein the plurality of data file objects comprises one or more data file folders and one or more data files arranged in a file folder hierarchy;
wherein displaying the first plurality of data file descriptors comprises displaying the first plurality of data file descriptors in a hierarchical view that visually conveys the file folder hierarchy;
wherein the plurality of data file objects comprises a particular data file folder that contains one or more particular data file sub-folders and one or more particular data files contained within the one or more particular data file sub-folders;
responsive to detecting user input, displaying a flattened view of the particular data file folder by removing display of the data file descriptors of the first plurality of data file descriptors corresponding to the one or more particular data file sub-folders and displaying the data file descriptors of the first plurality of data file descriptors corresponding to the one or more particular data files as if the one or more particular data files were contained directly, in the file folder hierarchy, in the particular data file folder;
responsive to obtaining filtering criteria, removing, from the flattened view, display of data file descriptors of the first plurality of data file descriptors corresponding any of the one or more particular data files that do not satisfy the filtering criteria.

15. A non-transitory computer-readable medium storing computer-executable instructions which, when executed by one or more processors, cause the one or more processors to perform:
displaying a display window as part of a user interface;
displaying, on said display window, a first plurality of data file descriptors;
wherein each data file descriptor of the first plurality of data file descriptors represents a first attribute of one corresponding data file object of a plurality of data file objects;
wherein each data file object of the plurality of data file objects corresponds to either a data file or a data file folder;
wherein the plurality of data file objects comprises one or more data file folders and one or more data files arranged in a file folder hierarchy;
wherein displaying the first plurality of data file descriptors comprises displaying the first plurality of data file descriptors in a hierarchical view that visually conveys the file folder hierarchy;
wherein the plurality of data file objects comprises a particular data file folder that contains one or more particular data file sub-folders and one or more particular data files contained within the one or more particular data file sub-folders;
responsive to detecting user input, displaying a flattened view of the particular data file folder by removing display of the data file descriptors of the first plurality of data file descriptors corresponding to the one or more particular data file sub-folders and displaying the data file descriptors of the first plurality of data file descriptors corresponding to the one or more particular data files as if the one or more particular data files were contained directly, in the file folder hierarchy, in the particular data file folder;
responsive to obtaining filtering criteria, removing, from the flattened view, display of data file descriptors of the first plurality of data file descriptors corresponding any of the one or more particular data files that do not satisfy the filtering criteria.

* * * * *